US012720199B2

(12) United States Patent
Jun et al.

(10) Patent No.: US 12,720,199 B2
(45) Date of Patent: Aug. 25, 2026

(54) DRIVING IMAGE RECORDING DEVICE FOR VEHICLE AND CONTROL METHOD OF THE SAME

(71) Applicants: Hyundai Motor Company, Seoul (KR); Kia Corporation, Seoul (KR)

(72) Inventors: Sung Hwan Jun, Hwaseong (KR); Dong Hyuk Jeong, Hwaseong (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 104 days.

(21) Appl. No.: 18/521,489

(22) Filed: Nov. 28, 2023

(65) Prior Publication Data

US 2024/0406554 A1 Dec. 5, 2024

(30) Foreign Application Priority Data

Jun. 5, 2023 (KR) ........................ 10-2023-0072162

(51) Int. Cl.
*H04N 23/68* (2023.01)
*H04N 23/667* (2023.01)

(52) U.S. Cl.
CPC ......... *H04N 23/681* (2023.01); *H04N 23/667* (2023.01)

(58) Field of Classification Search
CPC .. H04N 23/681; H04N 23/667; G07C 5/0866; G01S 19/01; G06T 7/215; G06V 20/58
USPC .......................................................... 386/148
See application file for complete search history.

(56) References Cited

U.S. PATENT DOCUMENTS

| | | | | |
|---|---|---|---|---|
| 11,586,856 | B2 * | 2/2023 | Futatsugi | G06N 3/0464 |
| 11,814,081 | B2 * | 11/2023 | Komori | G08G 1/166 |
| 11,920,948 | B2 * | 3/2024 | Kitahara | G08G 1/096758 |
| 12,043,283 | B2 * | 7/2024 | Wang | G06V 20/588 |
| 12,470,920 | B2 * | 11/2025 | Hemantharaja | H04L 63/065 |
| 2022/0132077 | A1 * | 4/2022 | Kim | H04N 7/188 |
| 2023/0147535 | A1 * | 5/2023 | Terazawa | G01C 21/30 |
| 2023/0148097 | A1 * | 5/2023 | Miyake | G01S 13/867 348/148 |
| 2024/0391425 | A1 * | 11/2024 | Ghannam | B60S 1/0896 |

* cited by examiner

*Primary Examiner* — Helen Shibru
(74) *Attorney, Agent, or Firm* — Fox Rothschild LLP

(57) ABSTRACT

A driving image recording device includes a camera module for monitoring the surroundings of a vehicle, a first memory for storing an image transmitted from the camera module, a second memory for storing a computer program that controls storage of the image; and a controller including a processor for executing the computer program, where the processor determines whether a wiper of the vehicle is in an on-state through execution of the computer program and determines whether to change a motion detection setting of the camera module according to this determination.

20 Claims, 6 Drawing Sheets

Applying the embodiment of the present invention

DRIVING IMAGE RECORDING DEVICE FOR VEHICLE AND CONTROL METHOD OF THE SAME

CROSS-REFERENCE TO RELATED APPLICATION

The present application claims under 35 U.S.C. § 119(a) the benefit of Korean Patent Application No. 10-2023-0072162, filed on Jun. 5, 2023, the entire contents of which are incorporated herein by reference.

BACKGROUND

(a) Technical Field

The present disclosure relates to a driving image recording device for a vehicle and a control method thereof.

(b) Description of the Related Art

A driving image recording device is an apparatus for recording an image of a driving situation of a vehicle.

To this end, the driving image recording device may include a controller, a memory for storing an image, and a camera for photographing the image.

In general, the driving image recording device stores vehicle driving data together with an image around a vehicle when driving and records an image according to an input setting when a set event is sensed during parking.

The driving video recording device was initially called a black box and was only installed as an external type, but recently, it is already built-in to the vehicle before releasing the vehicle.

The built-in type is more advantageous than the external type in that it is possible to access driving data of the host vehicle and to connect with other controllers, and it is expected that the use thereof will gradually increase.

The types of image sensor of the camera are classified into single pixels and subpixels, and electrons are primarily used in the camera of the driving image recording device.

A flickering effect may occur due to continuous flickering of the lighting and timing of the shutter speed of the camera at the time of photographing by the camera.

When an image frame captured at the flickering time of the lighting is different from an image frame of a different time, or when a black line is formed in the image on the contrary, the flickering effect is such an example.

Also, due to the flickering effect, a color of a traffic light may be recorded differently from its actual color of a traffic light during photographing. That is, the traffic light may not be captured in its color due to the time of flickering of the LED traffic light and the time of shuttering speed of the camera.

In the case of a single-pixel image sensor, a method of synthesizing a short exposure image and a long exposure image collected from a single pixel is used to counteract with the flickering effect.

To this end, the camera provides a motion detection function, and generally, the motion detection is set as "on".

However, the motion detection function has a limitation in which it is impossible to correct an afterimage of a subject that moves rapidly.

That is, during the RGB data smoothing-correction process of the fast-moving object, the colors of the edges of the object may be erroneously corrected.

In particular, when the wiper operates while photographing, a motion artifact effect may occur from the wiper image.

SUMMARY

At least one embodiment of the present disclosure is provided to minimize or resolve a motion artifact effect of a wiper image, which is generated through activation of a motion detection function of a camera.

According to an embodiment of the present disclosure, there is provided a control method of a driving image recording device comprising, the control method comprising: providing a camera module configured to monitor surroundings of a vehicle, a first memory configured to store an image transmitted from the camera module, a second memory configured to store a computer program for controlling the storage of the image, and a controller comprising a processor configured to execute the computer program; determining, by the processor executing the computer program, whether a wiper of the vehicle is in an on-state; and determining whether to change a motion detection setting of the camera module according to the determination.

In at least one embodiment of the present disclosure, the method further comprises determining, by the processor, whether there is an intersection or a traffic light within a set distance in front of the vehicle.

In at least one embodiment of the present disclosure, the method further comprises receiving, by the processor, GPS position information of the vehicle and determining whether there is an intersection or a traffic light ahead within the set distance using the GPS position information.

In at least one embodiment of the present disclosure, the method further comprises determining, by the processor, the motion detection setting of the camera module as "on" when it is determined that there is an intersection or a traffic light ahead within the set distance.

In at least one embodiment of the present disclosure, the method further comprises determining, by the processor, the motion detection setting of the camera module to be "off" when it is determined that there is no intersection or traffic light ahead within the set distance.

In at least one embodiment of the present disclosure, the method further comprises determining, by the processor, whether the wiper operation is "on" by receiving the on-signal of the wiper, when the on-signal of the wiper is receiver, starting a first time count, and maintaining the determination of turning off the motion detection setting when a following signal of the wiper operation as "on" is received before the first time count reaches the first set value.

In at least one embodiment of the present disclosure, the method further comprises determining, by the processor, the motion detection setting to be turned "on" when the following signal is not received until the first time count reaches the first set value.

In at least one embodiment of the present disclosure, the method further comprises receiving, by the processor, operation cycle information of the wiper and changing the first set value according to the operation cycle of the wiper.

In at least one embodiment of the present disclosure, the method further comprises receiving, by the processor, an operation off-signal of the wiper and determining the motion detection setting to be "on" when the operation on-signal of the wiper is not received before the second time count reaches the second set value.

A driving image recording device according to an embodiment of the present disclosure a comprises camera module configured to monitor surroundings of a vehicle, a first memory configured to store an image transmitted from the camera module, and a controller including a second memory configured to store a computer program for controlling the storage of the image and a processor configured to execute the computer program, wherein the processor is configured to determine whether a wiper of the vehicle is "on" through the execution of the computer program and determine whether to change a motion detection setting of the camera module according to the determination.

In the driving image recording device according to at least one embodiment of the present disclosure, the processor further configured to determine whether there is an intersection or a traffic light within a set distance in front of the vehicle.

In the driving image recording device according to at least one embodiment of the present disclosure, the processor is further configured to receive GPS position information of the vehicle and to determine whether there is an intersection or a traffic light ahead within the front set distance using the GPS position information.

In the driving image recording device according to at least one embodiment of the present disclosure, the processor is further configured to determine the motion detection setting of the camera module as "on", when it is determined that there is an intersection or a traffic light ahead within the set distance.

In the driving image recording device according to at least one embodiment of the present disclosure, the processor is further configured to determine the motion detection setting of the camera module to "off" when it is determined that there is no intersection or traffic light ahead within the set distance.

In the driving image recording device according to at least one embodiment of the present disclosure, the processor is further configured to determine whether the wiper operation state is "on" by receiving the operation on-signal of the wiper, when the operation on-signal of the wiper is received, start a first time count, and maintain the determination of turning off the motion detection setting, when a following signal of the wiper operation as "on" is received before the first time count reaches the first set value.

In the driving image recording device according to at least one embodiment of the present disclosure, the processor is further configured to determine the motion detection setting to be turned "on" when the following signal is not received until the first time count reaches the first setting value.

In the driving image recording device according to at least one embodiment of the present disclosure, the processor is further configured to receive operation cycle information of the wiper and change the first set value according to the operation cycle of the wiper.

In the driving image recording device according to at least one embodiment of the present disclosure, the processor is further configured receive an operation off-signal of the wiper and determine the motion detection setting to be "on" when the operation on-signal of the wiper is not received before the second time count reaches the second set value.

In the driving image recording device according to at least one embodiment of the present disclosure, the camera module ignores a motion detection setting change command of the processor when it is determined that it is night time through a gain value of an auto gain control AGC.

In the driving image recording device according to at least one embodiment of the present disclosure, the camera module performs the motion detection setting change command with a hysteresis section for a sunset time and a night time for the AGC gain value.

According to at least one embodiment of the present disclosure, a motion artifact effect of a wiper image generated due to activation of a motion detection function of a camera can either be minimized or resolved.

A vehicle may include the driving image recording device.

DETAILED DESCRIPTION

Figure 1:
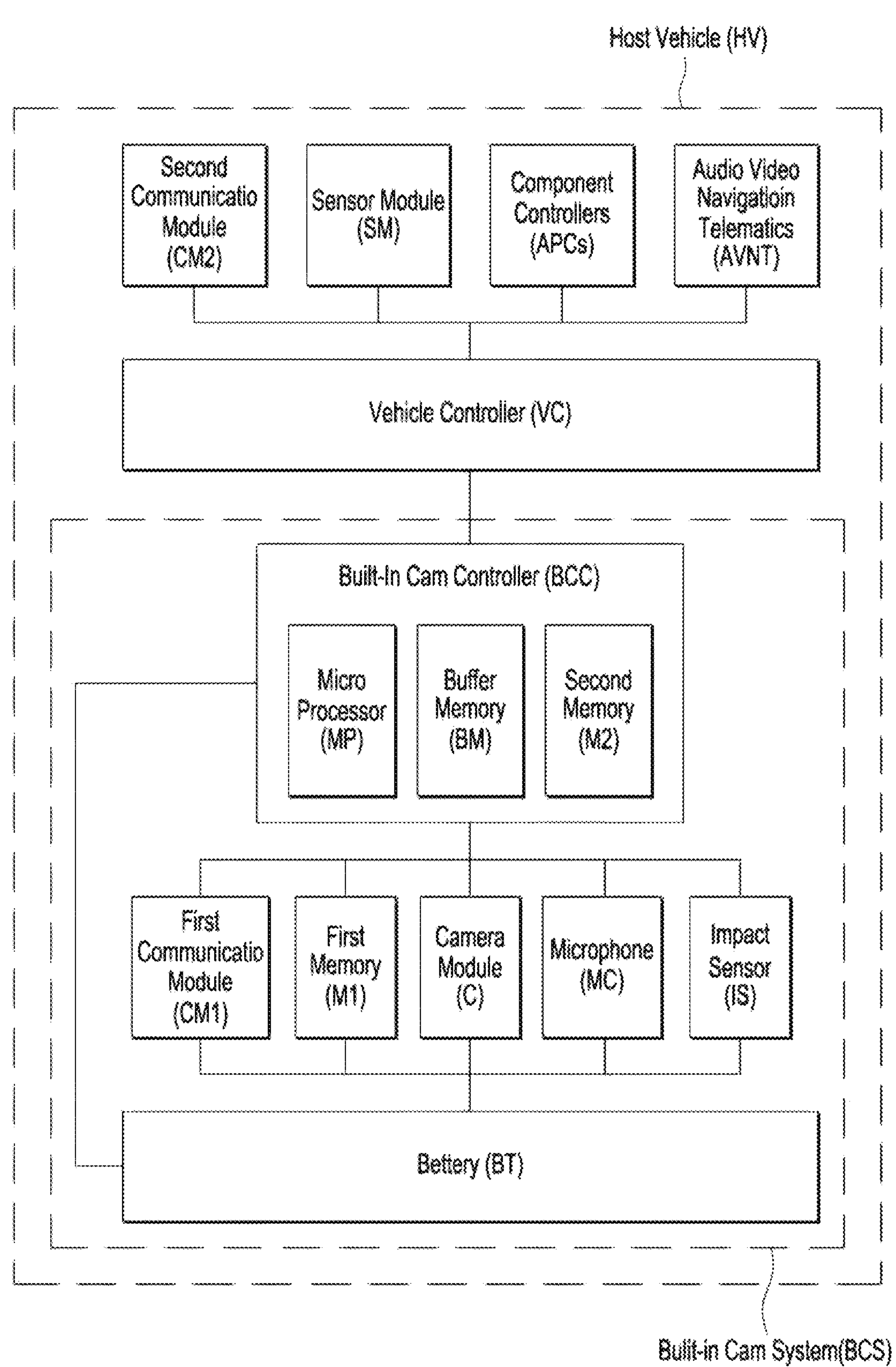
FIG. 1 is a block diagram conceptually illustrating a driving image recording apparatus according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Since the present disclosure is modified in various ways and has various embodiments, specific embodiments will be illustrated and described in the drawings. However, this is not intended to limit the present disclosure to specific embodiments, and it should be understood that the present disclosure includes all modifications, equivalents, and replacements included on the idea and technical scope of the present disclosure.

Terms including ordinals such as "first," "second," and the like may be used to describe various elements, but the elements are not limited by the terms. The terms are used only for the purpose of distinguishing one element from another element.

The term "and/or" is used to include any combination of a plurality of items to be included. For example, "A and/or B" includes all three cases such as "A", "B", and "A and B".

When an element is "connected" or "linked" to another element, it should be understood that the element may be directly connected or connected to another element, but another element may exist in between.

Unless otherwise defined, all terms used herein, including technical or scientific terms, have the same meaning as that generally understood by those skilled in the art. It will be understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, the processor includes a semiconductor integrated circuit and/or electronic devices that perform at least one or more of comparison, determination, calculation, and determination in order to achieve a programmed function. For example, the processor may be a computer, a microprocessor, a CPU, an ASIC, and a circuitry (logic circuits), or a combination thereof.

In addition, the computer-readable recording medium (or simply referred to as a memory) includes all types of storage devices in which data that can be read by a computer system is stored. For example, the memory may include at least one type of a flash memory of a hard disk, of a microchip, of a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

The recording medium is electrically connected to the processor, and the processor retrieves and records data from the recording medium. The recording medium and the processor may be integrated or may be physically separated.

Hereinafter, the embodiments of the present disclosure will be described in detail with reference to the accompanying drawings.

Referring to FIG. 1, the built-in driving image recording device, namely, a built-in cam system BCS, according to an embodiment of the present disclosure is installed in a host vehicle HV, and includes a camera module C, a computer-readable storage medium M1, a first communication module CM1, a microphone MC, an impact sensor IS, a power auxiliary battery BT, and a built-in cam controller BCC.

The driving image recording device of the present embodiment is a built-in type, but is not necessarily limited thereto.

First, the camera module C includes a front camera and a rear camera in this embodiment, but it is not necessarily limited thereto. The front camera is installed to capture an image of the front area of the vehicle HV and to capture an image of the rear area of the vehicle HV.

For example, the front camera may be installed at a position adjacent to the room mirror in the vehicle HV cabin of the window shield, and the rear camera may be installed on the rear window of the vehicle HV cabin or the rear bumper.

For example, the front camera and the rear camera have the image quality of either an HD, an FHD, or a Quad HD.

It is evident that the front camera and the rear camera do not need to have the same image quality, and a camera of an Advanced Drive Assistance System ADAS system of the host vehicle HV may be used.

Further, the camera has an aperture value of f/2.0 or less, preferably f/1.6 or less. If the aperture value decreases, more light is gathered so that recording may be made brighter. In addition, by applying image tuning technology to minimize the noise and the loss of light, clear recording is possible even in a dark environment.

In addition, the computer-readable recording medium includes all types of storage devices in which data that can be read by a computer system is stored. For example, the memory includes at least a memory type of a flash memory, of a hard disk, of a microchip, of a card (e.g., a Secure Digital (SD) card or an eXtream Digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

In this embodiment, the memory M1 is an external type of 64 gigabyte or a Micro SD of more thereof. For example, constant recording while driving can be performed for several hours, and constant recording while parking may be performed up to tens of hours. In addition, event recording according to impact detection may be performed up to several times.

The user can easily check the contents stored in the memory in a desktop computer or the like by extracting the SD card.

The information of the state of the SD card can be checked through the connected car service, and the time of replacement according to the memory state can also be checked.

The first communication module CM1 is for wired or wireless communication with the exterior and is not limited to communication protocol.

In the present embodiment, the first communication module CM1 includes a communication device capable of directly communicating with nearby devices, and illustratively supports Wi-Fi.

Due to Wi-Fi, the user can easily and quickly access the built-in cam through, for example, a smartphone.

The microphone MC supports voice recording. When the driving images of the vehicle HV is recorded, not only the images are recorded but also the voices are recorded as well.

The impact sensor IS senses an external impact, and for example, may be a one-axis or a three-axis acceleration sensor.

The impact sensor IS may be prepared as the built-in cam system BCS, but it is evident that it may be used as an acceleration sensor installed in the host vehicle HV.

The signals of the impact sensor IS may be a starting points for a later described event recording, and the degree of impact serving as a references thereof can be set by the user.

For example, the user can select an impact detection sensitivity which is the reference for event recording when setting up the built-in cam system BCS through a display screen (e.g., a later described AVNT screen) in the vehicle HV.

Illustratively, the impact sensitivities are divided into five levels: the first level (highly unresponsive), the second level (unresponsive), the third level (normal sensitivity), the fourth level (sensitive), and the fifth level (highly sensitive).

The built-in cam system BCS receives power from a battery (e.g., a 12 V battery) installed in the vehicle HV.

Although the system is operated by receiving power of the vehicle HV battery during parking as well as during driving, there may be an over-discharge problem of the vehicle HV battery, and thus, the present embodiment includes the power auxiliary battery BT.

In the present embodiment, the built-in cam system BCS receives power from any one of the battery of the vehicle HV, of the alternator in the case of the internal combustion engine vehicle, and of the lower DC/DC converter in the case of the electric vehicle, while receiving power from the power auxiliary battery BT during parking. However, it is not limited thereto.

The power auxiliary battery BT is charged and discharged depending on an operating environment of the vehicle HV and supplies optimal power for recording and OTA software update during parking.

The charging of the power auxiliary battery BT is performed by a vehicle HV battery (a low voltage battery or a high voltage battery of an electric vehicle), or performed by an alternator in the case of an internal combustion engine vehicle HV.

The built-in cam controller BCC is a superior controller that controls other components of the built-in cam system BCS, and exchanges signals with the controller VC of the host vehicle HV and/or a second communication module CM2 (vehicle communication module), the sensor module SM, the component controllers APCs, the audio video navigation telematics (AVNT), etc.

Here, the sensor module SM includes one or more of a speed sensor, of an acceleration sensor, of a vehicle position sensor (e.g., a GPS receiver), of a steering angle sensor, of a yaw rate sensor, of a pitch sensor, and of a roll sensor, and the component controllers APCs may include one or more of a turn signal controller, of a turn signal controller, of a wiper controller, of an ADAS system controller, and of an airbag controller.

The built-in cam controller BCC controls other components to perform constant recording during driving, constant recording during parking, and recording events to be recorded according to impact detection signals, etc.

During the recording, driving information of the vehicle HV may be recorded as well.

Here, the vehicle HV driving information includes time, vehicle speed, gear position, turn signal information, degree of detected impact (one corresponding to the above-described five steps), global positioning system GPS position information, etc.

The vehicle driving information is received from the vehicle controller VC, but it is evident that it may also be directly received from a corresponding module or component of the vehicle HV. For example, the vehicle speed may be directly received from a speed sensor of the vehicle HV, the turn signal information (or turn signal information from a turn signal controller) may be directly received from a turn signal controller, and the GPS position information may be received from a AVNT or a GPS receiver.

As described above, the event recording is performed when the occurring event is detected during parking, depending on the sensitivity of the detected impact set by the user. In the recording events, recording is performed from a set time before the time of the occurring event to a set time after the time of the occurring event, and the set time is selected by the user.

The AVNT is connected to the built-in cam controller BCC through the vehicle controller VC or directly, and the AVNT screen functions as a user interface for receiving various setting parameters of the built-in cam system BCS from the user.

The built-in cam controller BCC transmits recorded content to an external server according to a set cycle, a user selection, or an event (e.g., a degree of detected impact) of user setting.

The built-in cam controller BCC includes a memory M2 and a processor MP to perform its functions.

In an embodiment, the processor MP includes a semiconductor integrated circuit and/or electronic elements that perform at least one or more of comparing, determining, calculating, and determining to achieve a programmed function. Illustratively, the processor may be any one or a combination of a computer, a microprocessor, a CPU, an ASIC, and a circuitry (logic circuits).

The memory M2 may be any type of storage device that stores data that can be read by a computer system, and may include, for example, at least a flash memory type of a hard disk, of a microchip, of a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

Operating software of the BCC is stored in the memory M2, and the processor MP reads and executes the corresponding software to perform the function of the BCC.

In addition, the built-in cam controller BCC includes a buffer memory BM for determination, calculation, and the like in the processor MP.

Figure 2:
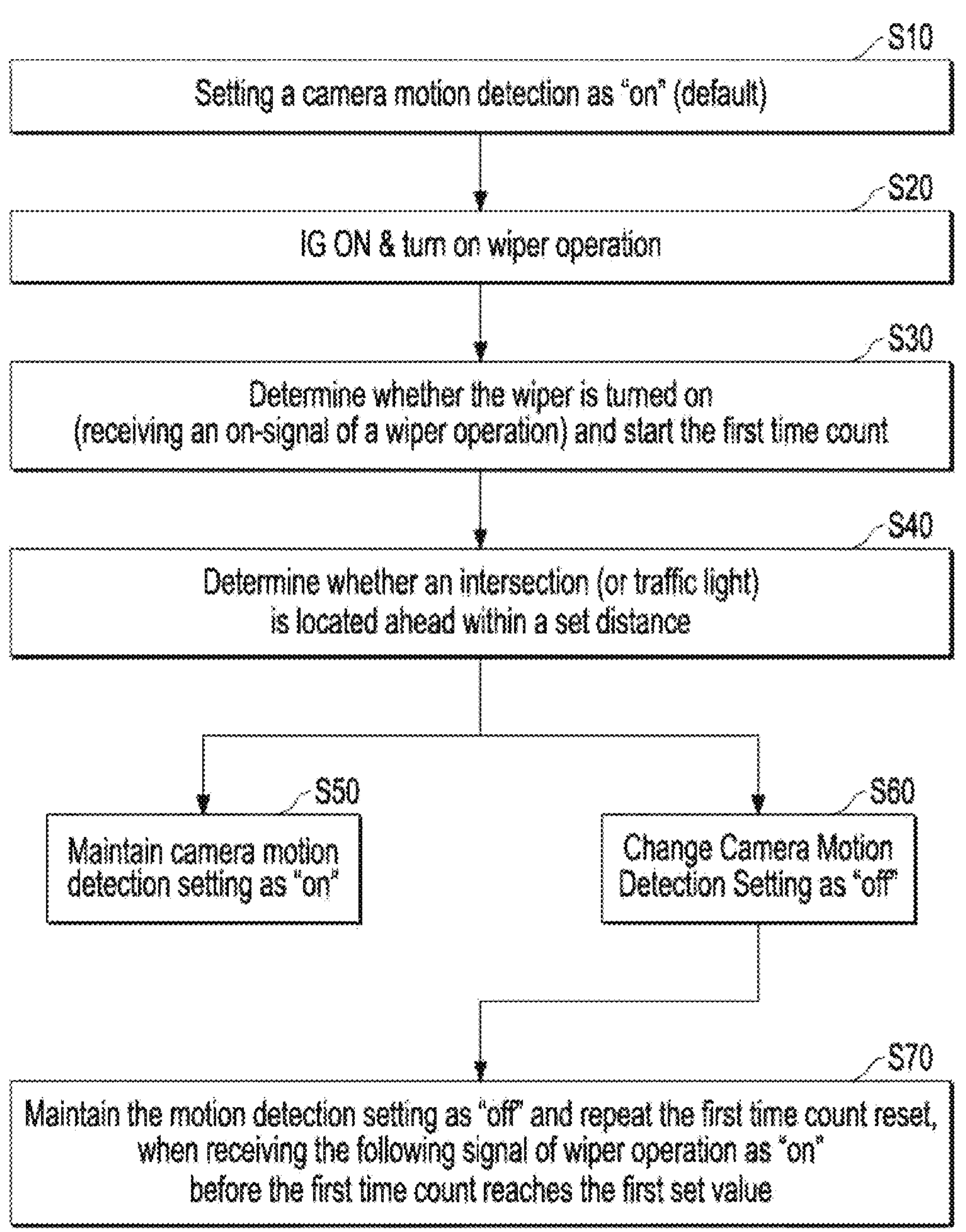
FIGS. 2 to 4 are flowcharts illustrating a control method of the driving image recording device according to an embodiment of the present disclosure.

Hereinafter, a control method according to an embodiment of the present disclosure will be described in detail with reference to FIGS. 2 to 4.

First, S10 represents a state in which the motion detection function of the camera module C is set as default.

S20 represents a current start-on state of the vehicle HV, and the operation switch of the wiper is "on".

In S30, the BCC receives the wiper operation on-signal, and accordingly, starts to count the first time count.

The wiper controller, for example, generates a clock signal according to an operation cycle set in association with an operation mode (e.g., low speed, high speed, auto, etc.) selected by the driver as the driver turns on the wiper operation switch, and periodically switches the power to on/off to the wiper actuator according to the clock signal.

The operation cycle of the wiper is automatically determined by the system depending on the selected operation mode, that is, depending on the mode selected among the low-speed mode, a high-speed mode, or auto mode.

For example, the operation cycle in the low speed mode is 3 seconds. In other words, the wiper sweeps the window every three seconds in the low-speed mode.

The wiper operation signal is received from the vehicle controller VC, but not necessarily limited thereto, and it may be received directly from the wiper controller.

The wiper operation on-signal may be, for example, a clock signal generated by the wiper controller, but it is not limited thereto. Another example of the wiper operation on-signal may be a separate signal generated in synchronization with turn-on of a waveform of power supplied to the wiper actuator.

Every signal for turning on the wiper is transmitted to the built-in cam controller BCC.

In the following step of S40, the BCC determines whether an intersection or a traffic light is positioned within a predetermined distance from the front.

To this end, the built-in cam controller BCC receives GPS information on the current position of the direct host vehicle HV from the AVNT or the GPS receiver.

In addition, it is possible to receive the location information of an intersection or traffic light positioned closest to the front of the driving route from the AVNT.

Here, the driving route is a route determined by the navigation function according to the destination selection by the driver, but when there is no such driving route, the AVNT estimates the driving route based on the current driving road and the driving direction of the host vehicle HV.

As a result of the determination in S40, if it is determined that the intersection or the signal ahead is positioned within the predetermined distance as in S50, the built-in cam controller BCC determines to maintain an "on" state with respect to the motion detection setting of the camera module C.

In S50, when it is determined whether the camera module C is "on" with respect to the motion detection setting, a control command to maintain the built-in cam controller BCC as an "on" state, is transmitted to the camera module C, but it is not limited thereto. In this case, it is irrelevant even if the built-in cam controller BCC does send any command to the camera module C.

Meanwhile, as a result of the determination in S40, when it is determined that there is no intersection or traffic light ahead within the predetermined distance, the built-in cam controller BCC is determined as "off" with respect to the motion detection setting of the camera module C in S60.

The built-in cam controller BCC transmits a control command to the camera module C to change the motion detection setting to "off".

When the above control command is received, the camera module C changes the motion detection setting to OFF accordingly. However, the control command may be disregarded depending on the time period, which will be described later.

Meanwhile, in S70, the BCC checks whether a following signal for turning on the wiper operation is received before the first time count reaches the first set value, and if so, determines to turn off the motion detection setting and resets the first time count.

The built-in cam controller BCC resets the first time count and recounts, and then it repeats in comparison with the first set value.

Here, the built-in cam controller BCC distinctively determines the first setting depending on the operation mode of the wiper.

As in the above-described example, when the operation mode is at a low speed, the first set value is set to 3 seconds.

The built-in cam controller (BCC) determines whether the operation of the wiper is switched off through an operation of comparing the first time count with the first set value.

In addition, when it is determined that the operation of the wiper is switched "off", the built-in cam controller BCC transmits a control command to change the motion detect setting to "on" to the camera module C.

Figure 3:
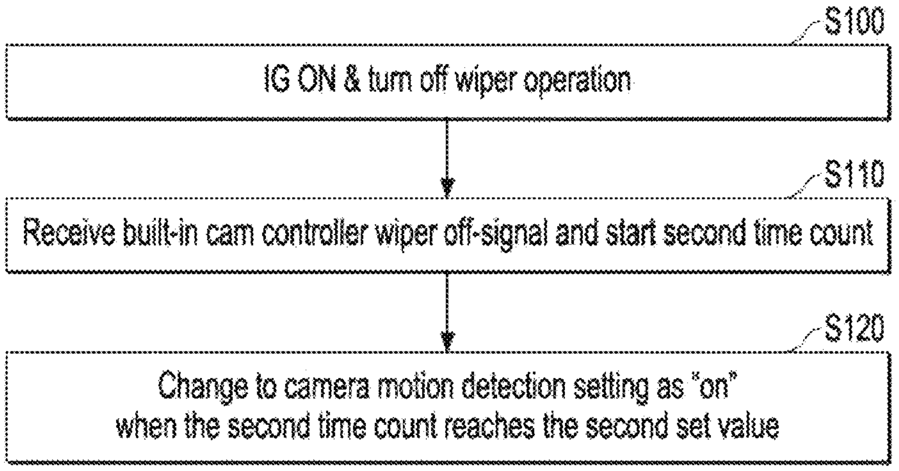

Meanwhile, FIG. 3 illustrates a control method in a state in which the wiper operation is off.

In S100, the start of the host vehicle HV is on, and the wiper operation is "off".

In S110, the BCC receives the wiper turn-off signal, and the BCC starts to count the second time count according to the reception thereof.

If the wiper operation on-signal is not received until the second time count reaches the second set value at S120, the built-in cam controller BCC determines to turn on the motion detection setting of the camera module C.

Here, the second set value may also be determined depending on the operating mode of the wiper.

The built-in cam controller BCC transmits a control command to the camera module C as the motion detection setting is set to "on".

Figure 4:
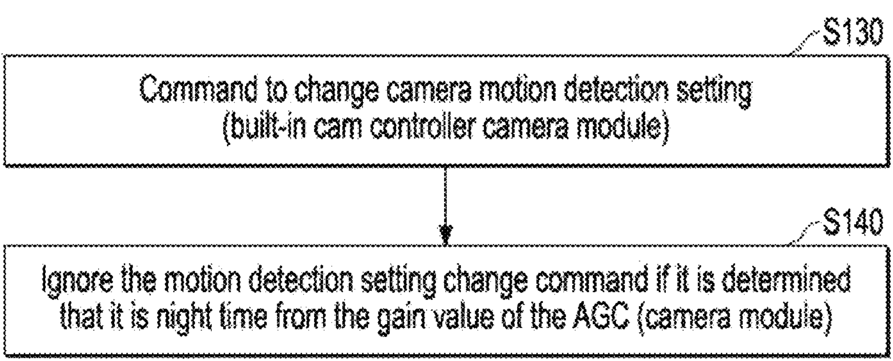

FIG. 4 illustrates a control method when a command to change a motion detection setting is received by the camera module C from the built-in cam controller BCC, the camera module C ignores the command depending on setting conditions.

First, S130 represents that the BCC transmits the command to change the motion detection setting to the camera module C as described above.

The camera module C determines whether the current time zone is night, daytime, or sunset through a gain value of an auto gain control (AGC).

Figure 5:
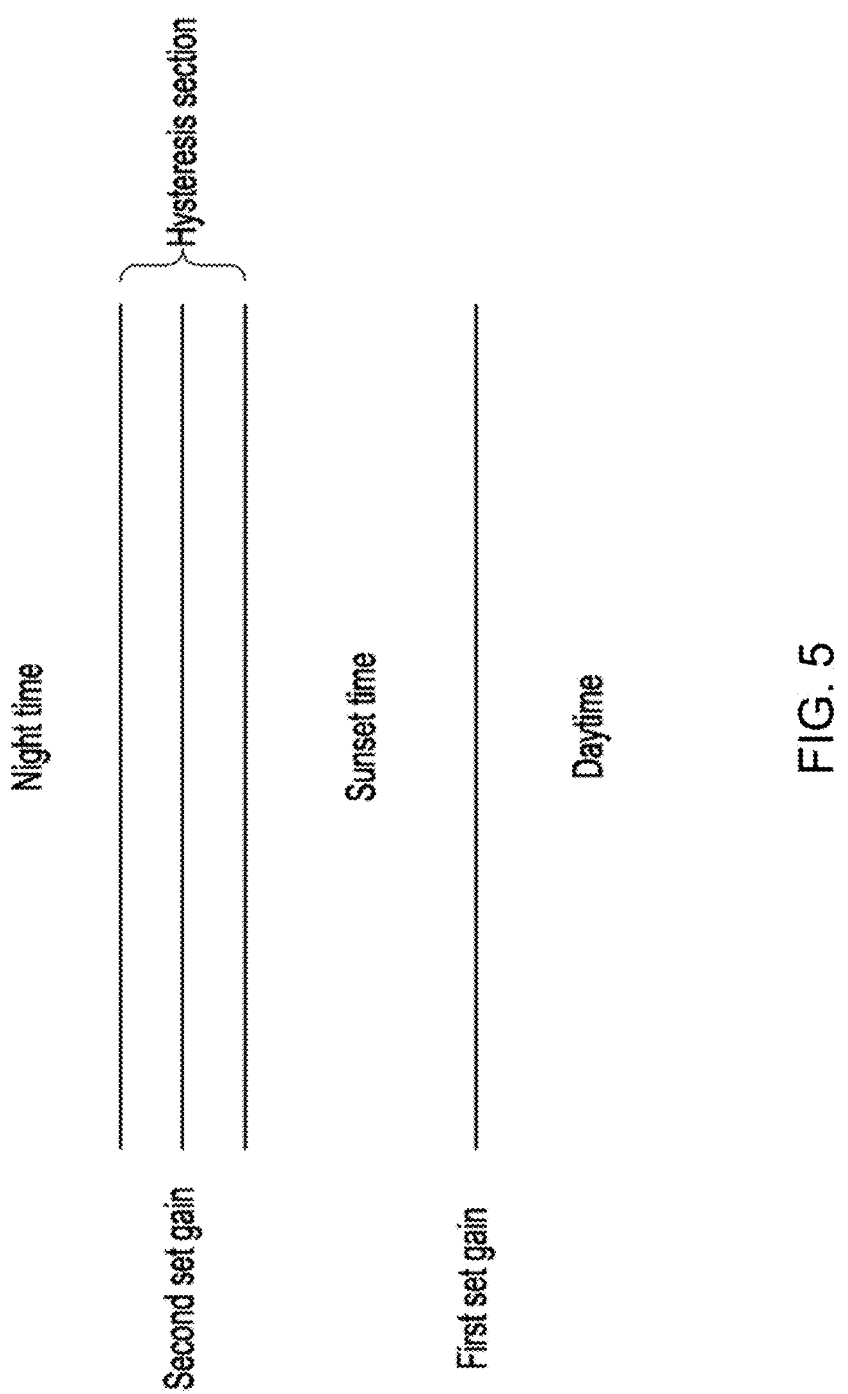
FIG. 5 illustrates a gain value setting for a camera auto gain control (AGC).

For example, as shown in FIG. 5, the camera module C determines it as the daytime when the gain value of the AGC is less than or equal to the first set gain, determines it as a night time when the gain value of the AGC is greater than or equal to the first set gain, and determines it as a sunset time when the gain value of the AGC is between the first set gain and the second set gain.

If it is determined as night time, the camera module C ignores the motion detection setting change command received from the BCC in S140.

For example, the camera module C ignores a command to change the motion detection setting to "off" at night and maintains the motion detection setting to "on".

A hysteresis period is set in respect to the second setting gain at a time when the sunset time is transitioned to the night time, which makes it possible to prevent an excessive and frequent volatilities in the motion detection setting.

For example, when the AGC gain value rises from the value corresponding to the sunset time and entering the hysteresis period, the motion detection setting is determined to correspond to the sunset time as is, and when the AGC gain value decreases from the value corresponding to the night time and entering the hysteresis period, the motion detection setting is determined to correspond to the night time as is.

In the above-described embodiment, it has been premised whether the wiper is "on" is determined by receiving the wiper operation on-signal, but the present disclosure is not limited thereto.

For example, it is possible to determine whether the wiper is operating by analyzing the images captured from the camera module C. That is, it is possible to determine that the wiper is on by detecting the wiper sweeping the window through the analysis of the images captured by the camera module C.

In addition, it is possible to determine the operation cycle of the wiper through continuous image photographing and analysis.

Figure 6:
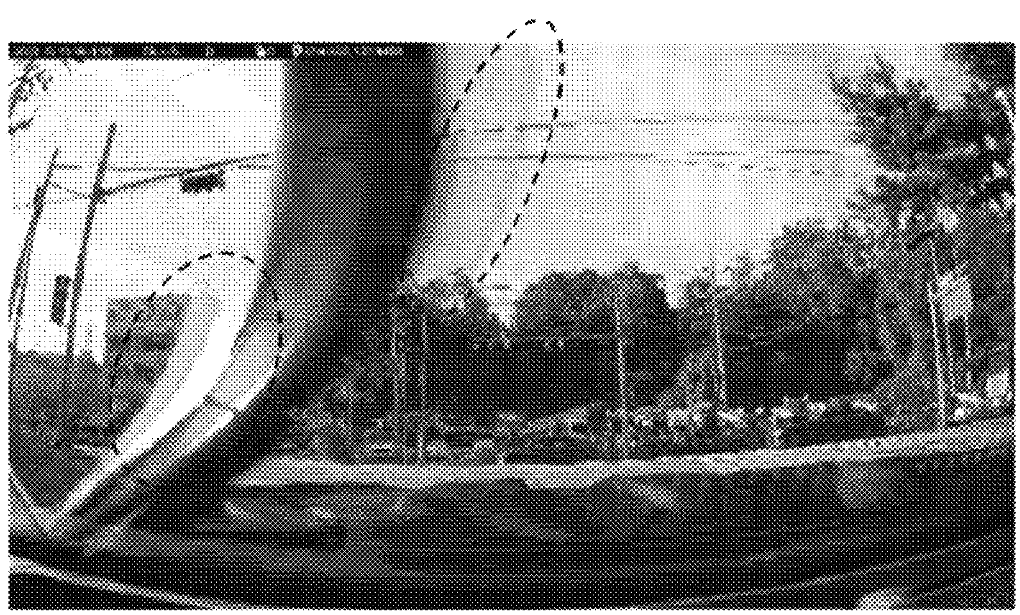
FIG. 6 compares results before and after applying one embodiment of the present disclosure.
Figure 6:
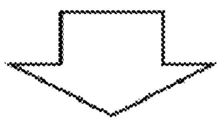
Figure 6:

FIG. 6 illustrates a result of applying the control method according to the embodiment of the present disclosure.

In FIG. 6, the picture above corresponds to a case where the control method of the present disclosure is not applied, and the picture below corresponds to a case where the control method of the present disclosure is applied.

As shown in FIG. 6, an afterimage image (an area surrounded by a dotted line) appears surrounding the wiper in the picture above, whereas there is no afterimage at all in the picture below.

Although the embodiments of the present disclosure have been disclosed hereinabove, it may be understood by those skilled in the art that the present disclosure may be variously modified and altered without departing from the scope and spirit of the present disclosure described in the following claims.

What is claimed is:

1. A control method of a driving image recording device, the control method comprising:

providing a camera module configured to monitor surroundings of a vehicle, a first memory configured to store an image transmitted from the camera module, a second memory configured to store a computer program for controlling storage of the image, and a controller comprising a processor configured to execute the computer program;

determining, by the processor, whether a wiper of the vehicle is in an on-state; and determining, by the processor, whether to change a motion detection setting used for image synthesis of the camera module according to the determination.

2. The control method of claim 1, further comprising determining, by the processor, whether there is an intersection or a traffic light within a set distance in front of the vehicle.

3. The control method of claim 2, further comprising receiving, by the processor, GPS position information of the vehicle and determining the intersection or the traffic light is within the set distance using the GPS position information.

4. The control method of claim 2, further comprising determining, by the processor, the motion detection setting of the camera module as on when it is determined that the intersection or the traffic light is ahead within the set distance.

5. The control method of claim 2, further comprising determining, by the processor, the motion detection setting of the camera module to be off when it is determined that there is no intersection or traffic light ahead within the set distance.

6. The control method of claim 5, further comprising determining, by the processor, whether the wiper is in the on-state by receiving an on-signal of the wiper, when the on-signal of the wiper is received, starting a first time count; and maintaining the determination of turning off the motion detection setting when a following signal of the wiper is received before the first time count reaches a first set value.

7. The control method of claim 6, further comprising determining, by the processor, the motion detection setting to be turned on when the following signal is not received until the first time count reaches the first set value.

8. The control method of claim 5, further comprising receiving, by the processor, an operation cycle of the wiper and changing a first set value according to the operation cycle of the wiper.

9. The control method of claim 1, further comprising receiving, by the processor, an operation off-signal of the wiper and determining the motion detection setting to be on when an on-signal of the wiper is not received before the second time count reaches a second set value.

10. A driving image recording device comprising:

a camera module configured to monitor surroundings of a vehicle;

a first memory configured to store an image transmitted from the camera module; and a controller including a second memory configured to store a computer program for controlling storage of the image and a processor configured to execute the computer program, wherein the processor is configured to:

determine whether a wiper of the vehicle is in an on-state through execution of the computer program, and determine whether to change a motion detection setting used for image synthesis of the camera module according to the determination.

11. The driving image recording device of claim 10, wherein the processor is further configured to determine whether there is an intersection or a traffic light within a set distance in front of the vehicle.

12. The driving image recording device of claim 11, wherein the processor is further configured to receive GPS position information of the vehicle to determine whether the intersection or the traffic light is within the set distance using the GPS position information.

13. The driving image recording device of claim 11, wherein the processor is further configured to determine the motion detection setting of the camera module as on when the intersection or the traffic light is within the set distance.

14. The driving image recording device of claim 11, wherein the processor is further configured to determine the motion detection setting of the camera module to off when there is no intersection or traffic light ahead within the set distance.

15. The driving image recording device of claim 14, wherein the processor is further configured to:

determine whether the wiper is in the on-state by receiving an on-signal of the wiper;

when the on-signal of the wiper is received, start a first time count; and maintain the determination of turning off the motion detection setting, when a following signal of the wiper operation as "on" is received before the first time count reaches a first set value.

16. The driving image recording device according to claim 15, wherein the processor is further configured to determine the motion detection setting to be turned "on" when the following signal is not received until the first time count reaches the first set value.

17. The driving image recording device of claim 14, wherein the processor is further configured to receive operation cycle information of the wiper and change a first set value according to the operation cycle of the wiper.

18. The driving image recording device of claim 10, wherein the processor is further configured receive an operation off-signal of the wiper and determine the motion detection setting to be on when an on-signal of the wiper is not received before the second time count reaches a second set value.

19. The driving image recording device of claim 10, wherein the camera module ignores the motion detection setting change command of the processor when it determines that it is night time through a gain value of an auto gain control (AGC), or the camera module performs the motion detection setting change command with a hysteresis period for a sunset time and the night time for the AGC gain value.

20. A vehicle comprising the driving image recording device of claim 10.

* * * * *